United States Patent Office 3,526,659
Patented Sept. 1, 1970

3,526,659
PROCESS FOR THE MANUFACTURE OF
α,β-UNSATURATED ACID CHLORIDES
Paul Janssen, Bensberg-Refrath, and Hermann Richtzenhain, Cologne-Sulz, Germany, assignors to Dynamit Nobel Aktiengesellschaft, a corporation of Germany
Filed Jan. 6, 1967, Ser. No. 607,797
Claims priority, application Germany, Jan. 8, 1966,
D 49,098
Int. Cl. C07c 51/58, 57/04
U.S. Cl. 260—544                10 Claims

ABSTRACT OF THE DISCLOSURE

Process for preparing chlorides of α,β-unsaturated monocarboxylic acids by chlorinating α,β-unsaturated aldehydes (aldehyde: chlorine molar ratio 1:1–≦2, preferably 1:1–1.3) at a temperature of from 250–500° C. in the presence of a chlorinated or fluorinated hydrocarbon diluent.

---

Figure 1:
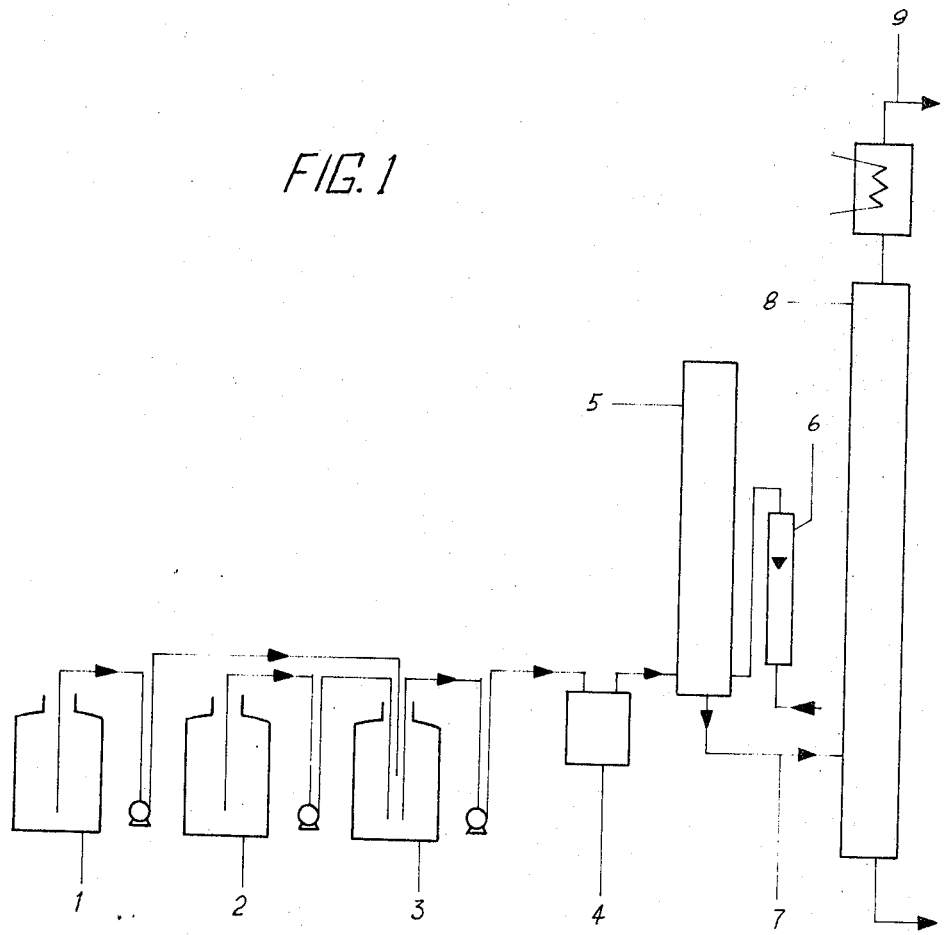

The present invention relates to a process for the manufacture of chlorides of α,β-unsaturated monocarboxylic acids. More particularly the present invention relates to a process for the preparation of chlorides of α,β-unsaturated monocarboxylic acids by the high temperature chlorination of α,β-unsaturated aldehydes.

It has already been proposed to manufacture the chlorides of unsaturated acids, such as acrylic, methacrylic or crotonylic chloride, by chlorinating the corresponding unsaturated aldehydes in the temperature range between 200 and 600° C. The ratio of unsaturated aldehyde to chlorine employed ranges between 5:1 and 1:1, i.e., an excess of unsaturated aldehyde being used. Due, however, to uncontrollable side-reactions, cleavage of the acryloyl radical takes place in the aforesaid reaction, resulting in the formation of vinyl radicals in addition to carbon monoxide, and in the formation of vinyl chloride ("Acrolein," John Wiley & Sons, New York, 1962, p. 155).

The necessity of using an excess of acrolein requires a circulation of acrolein, which results additionally in considerable losses because of the very high reactivity of this substance.

Further, the hydrogen chloride formed in the substitutive chlorination is added onto excess aldehyde resulting in the formation of aldehydes chlorinated in the β position. In this manner, β-chlorpropionaldehyde is formed when acrolein is used as starting material, and β-chlorisobutyraldehyde is formed when methacrolein is used as starting material. In the presence of hydrochloric acid, the said chlorinated aldehydes have a tendency to trimerize rapidly ("Organic Synthesis, Collective Vol. I, 155") with the formation of derivatives of trioxan, which can be reconverted into the starting material only to a slight extent.

It is an object of the present invention to provide a method of preparing chlorides of α,β-unsaturated monocarboxylic acids avoiding the disadvantages of the known method.

A further object of the present invention is to provide a method of preparing chlorides of α,β-unsaturated monocarboxylic acids whereby side-reactions are avoided and high yields of the desired chloride obtained.

Further objects and advantages will appear hereinafter.

In accordance with the invention, it has now been found that chlorides of α,β-unsaturated monocarboxylic acids can be obtained by chlorinating an α,β-unsaturated aldehyde with chlorine in the molar ratio of 1 to 1–≦2, preferably 1:1–1.3, at a temperature of from 250–500° C. in the presence of a chlorinated or fluorinated hydrocarbon as diluent.

Suitable starting products for use in the process of the invention are α,β-unsaturated aldehydes of the formula

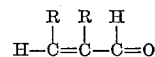

wherein R may be hydrogen or a methyl radical. Instances of α,β-unsaturated aldehydes coming within the above formula are acrolein, methacrolein, crotonaldehyde and α-methylcroton aldehyde. The α,β-unsaturated aldehyde used as starting material should be as free of water as possible, in order that as high acid chloride yield as possible be obtained. It has been found, however, that a water content such as that which is present in the azeotropic mixture of water and acrolein does not disturb the chlorination process. In the case of acrolein, however, a corresponding percentage of acrylic acid is obtained at the expense of the acrylic acid chloride.

The reaction, according to the invention, is carried out in the presence of a chlorinated or fluorinated hydrocarbon as diluent. Preferably those chlorinated or fluorinated hydrocarbons are used whose boiling points lie in the 35–250° C. range at normal pressure. Chlorinated cycloaliphatic and aromatic hydrocarbons can be used in addition to aliphatic chlorinated or fluorinated hydrocarbons. Mixtures thereof can also be used. Particularly suitable are those diluents which are inert under the reaction conditions. However, there can also be used those diluents which have a substantially lower speed of chlorination than the α,β-unsaturated aldehydes, i.e., those which, under the conditions of the reaction, behave as quasi-inert compounds. Instances of chlorinated and fluorinated aliphatic hydrocarbons suitable for use herein are methylene chloride, chloroform, carbon tetrachloride, perchlorethylene, hexachlorbutadiene, and the like. Examples of suitable chlorinated or fluorinated aromatic hydrocarbons include: chlorobenzene, fluorobenzene, 1,2-, 1,3-, and 1,4-dichlorobenzene, 1-chloro-4-fluorobenzene, 1,3,4-, 1,2,4- and 1,3,5-trichlorobenzene, etc. In conducting the reaction, a chlorinated or fluorinated hydrocarbon is preferably selected, the boiling point of which differs from the boiling point of the unsaturated monocarboxylic acid chloride formed in the reaction, i.e., those which boil at either higher or lower temperatures than do the carboxylic acid chlorides. This requirement makes possible a satisfactory separation of the components of the resultant mixture. The chlorinated or fluorinated hydrocarbons can, following such separation, be purified by distillation and fed back into the process, if desired.

The reason for the special suitability of chlorinated or fluorinated hydrocarbons as diluents is believed to lie in the following explanation:

The substitutive chlorination of α,β-unsaturated aldehydes is carried out with technically interesting yields only at temperatures above 250° C. The reaction takes place spontaneously and is so highly exothermic that decomposition can take place with a heavy segregation of carbon. The energy-rich molecules thus developed must be deactivated by the transfer of this energy to inert molecules, thus avoiding breakdown into radicals. The chlorinated or fluorinated hydrocarbons as used in accordance with the invention are especially well suited for this purpose.

Furthermore, the presence of these chlorinated or fluorinated hydrocarbons in the condensation of the reaction gas brings about a rapid removal of the hydrogen chloride formed by the reaction, since the solubility thereof in these agents is very slight. This reduces the danger of a side-reaction between the hydrogen chloride and the unsaturated acid chlorides that are formed. Furthermore, the hydrogen chloride can be recovered without appreciable losses.

Methyl chloride, methylene chloride, chloroform or ethyl chloride, for example, are particularly suitable for use in the manufacture of acrylic chloride (B.P. 74–76° C.), preference being given to methylene chloride. Carbon tetrachloride can be used advantageously for the manufacture of methacrylic chloride or crotonylic chloride. The quantity of the chlorinated or fluorinated hydrocarbons added can be varied within wide limits. Preferably one to five times the amount of the aldehyde of chlorinated or fluorinated hydrocarbon is used. The chlorination can be carried out in the temperature range of between 250 and 500° C., and preferably between 300 and 450° C.

The reactants, the unsaturated aldehydes and the chlorine, are introduced into the reaction zone separately and in vapor form.

It is advisable to mix the chlorinated or fluorinated hydrocarbon with one of the two reactants and introduce the mixture into the reaction. Preferably, it is mixed with the aldehyde. Alternatively, the chlorinated or fluorinated hydrocarbons can be injected in liquid form into the reaction zone through appropriate nozzles.

It has generally proven advantageous to preheat the streams of aldehyde and chlorine gases. The heat evolved in the chlorination recation can be utilized for the preheating, thereby simultaneously aiding in the removal of the heat of reaction. The preheating temperature depends on the conditions of reaction, such as the ratio of aldehyde to chlorinated or flourinated hydrocarbon, the size of the reactor, the rate of flow or time of stay, and the temperature gradients of the structural elements of the reactor. As a rule, a preheating temperature ranging from 200 to 450° C. is adequate.

The process of the present invention is preferably conducted at normal pressure. It can also be performed at reduced pressure, however.

The chlorides of $\alpha,\beta$-unsaturated monocarboxylic acids prepared according to the invention are valuable monomers. They can go on to be used as intermediates in the manufacture of esters.

In the examples set out hereinafter, the arrangement shown in the drawing (FIGS. 1 and 2) was used for carrying out the chlorination process. In FIG. 1 a diagrammatic representation of the process is shown. The required amounts of the chlorinated or fluorinated hydrocarbons were taken from reservoir 1, and those of the $\alpha,\beta$-unsaturated aldehyde were taken from reservoir 2, by means of a proportioning pump, and each pumped into the mixing vessel 3 which was equipped with an agitator. The resulting mixture was withdrawn from the mixing vessel 3 by means of a continuously variable proportioning pump and fed into the evaporator 4 from which it was then passed in vapor form into reactor 5. At the same time, chlorine gas was introduced through a flow meter 6 into the reactor 5. The reaction products which formed were passed through line 7 into column 8 which served for the separation of the liquid form the gaseous reaction products which are discharged via line 9. When a chlorinated or fluorinated hydrocarbon was used, which had a higher boiling point than the $\alpha,\beta$-unsaturated monocarboxylic acid chloride that was formed, the chlorinated or fluorinated hydrocarbon was withdrawn from the sump of the column and could be fed back into reservoir 1 if desired after rectification. The superimposed condenser served in this case for the condensation of the $\alpha,\beta$-unsaturated monocarboxylic acid chloride that was formed. When the $\alpha,\beta$-unsaturated carboxylic acid chloride and chlorinated or fluorinated hydrocarbon had the same boiling point they could be separated either from the sump or from the bottom of the condenser. When the chlorinated or fluorinated hydrocarbon had a lower boiling point, it was withdrawn at the top along with the hydrogen chloride and separated from the gas mixture through the superimposed condenser. The sump product in this case would be the unpurified monocarboxylic acid chloride.

Figure 2:
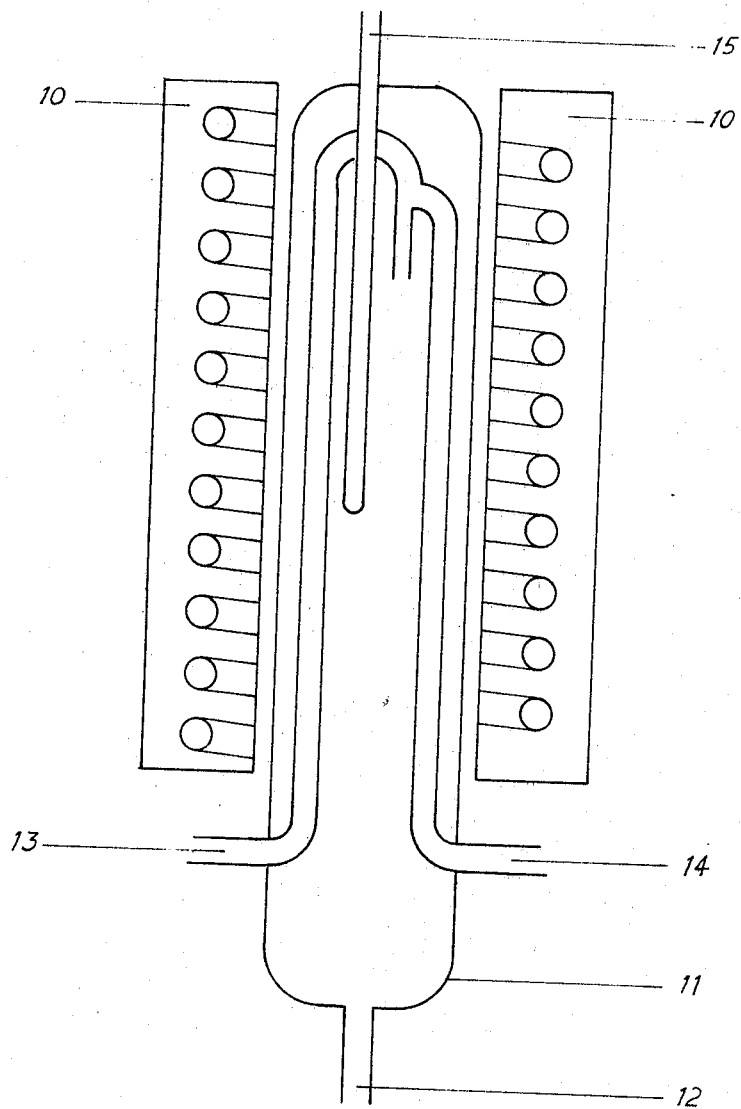

FIG. 2 shows the reactor 5, which was constructed as follows in the examples set out below:

A glass cylinder 11 having a hight of 75 cm. and a 50 mm. inner diameter, contained at the bottom two tubular inlet lines 13 and 14 having an inside diameter of 3 mm. The inlet line 13 served for the introduction of the mixture of $\alpha,\beta$-unsaturated aldehyde and chlorinated or fluorinated hydrocarbon. The chlorine was introduced into the reactor through the inlet line 14. Inlet lines 13 and 14 run upwardly in the interior of the reactor, inlet line 13 being looped over. The nozzle-like outlet of line 13 had an orifice of 2 mm. Above this nozzle, the chlorine gas line 14 was introduced into line 13. It was found to be advantageous for the outlet orifice to have a smaller cross section than the inlet lines carrying the gaseous starting products. The glass cylinder 11 was inserted into a tubular heater 10 which could be heated electrically. FIG. 2 shows the coil winding. For temperature control, the reactor 5 was provided with a well 15 which was fused in place, and which served to hold the thermometer. The gaseous reaction product was drawn off through 12 and introduced into column 8.

The following examples are given to illustrate the process of the invention and are in nowise to be construed as a limitation thereof.

EXAMPLE 1

In evaporator 4, 200 ml. (3 mols) acrolein and 400 ml. methylene chloride were evaporated per hour, 67.2 liters chlorine gas were introduced into the reactor per hour. Before starting the chlorination reaction, the reactor was preheated to 280° C. After the reaction gases were proportioned in, the temperature rose to 290–400° C., and was kept at this temperature by regulating the heating of the reactor. Column 8 was so adjusted that the temperature was 41° C., and the temperature above the sump phase was 76–77° C. The methylene chloride was fed back into the supply vessel 1. 263 grams of sump product were obtained per hour, having a content of more than 80% acrylic acid chloride, along with about 5% acrylic acid.

The preliminary drying of the acrolein resulted in a further increase in the yield of acrylic acid chloride.

EXAMPLE 2

In place of the acrolein, 167 ml. of methacrolein and 500 ml. of carbon tetrachloride were evaporated per hour according to procedure of 1. Two mols of chlorine gas were introduced hourly into the reactor which was preheated to 300° C. The reaction temperature rose to 450° C., and was kept there by regulating the heating of the reactor.

In the distillation column 8, a head temperature of 77° C. and a sump temperature of 90 to 92° C. were maintained. The sump product was recovered in a quantity of 205 grams per hours, and consisted to a great extent of methacrylic acid chloride.

EXAMPLE 3

Crotonaldehyde and carbon tetrachloride were introduced into a reactor heated to 300° C., along with 2 mols of chlorine in the same quantity ratios. The reaction temperature was then adjusted to 420 to 450° C. 205 to 210 grams of sump product were obtained. The sump temperature of column 8 was maintained at 110° C. The sump product consisted in the main of the corresponding acid chloride.

We claim:

1. Process for the preparation of chlorides of $\alpha,\beta$ olefinically unsaturated monocarboxylic acids which comprises chlorinating $\alpha,\beta$ olefinically unsaturated aldehyde in a molar ratio of $1:1-\leqq2$, of aldehyde to chlorine at a temperature of 250–500° C. in the presence of a member selected from the group consisting of chlorinated and fluorinated hydrocarbons having a boiling point in the range of 35–250° C. at normal pressure as diluent.

2. Process according to claim 1 wherein said diluent has a boiling point which differs from the boiling point of the acid chloride reaction product.

3. Process according to claim 1 wherein said α,β-unsaturated aldehyde has the formula

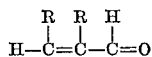

wherein R is a member selected from the group consisting of hydrogen and methyl.

4. Process according to claim 1 wherein said aldehyde is acrolein.

5. Process according to claim 1 wherein said aldehyde is methacrolein.

6. Process according to claim 1 wherein said aldehyde is crotonaldehyde.

7. Process according to claim 1 wherein said diluent is a member selected from the group consisting of methylene chloride, chloroform, carbon tetrachloride, perchlorethylene, hexachlorbutadiene, chlorobenzene, fluorobenzene, 1,2-, 1,3-, and 1,4-dichlorobenzene, 1 - chloro-4-fluorobenzene and 1,3,4-, 1,2,4- and 1,3,5-trichlorobenzene.

8. Process according to claim 1 wherein said aldehyde and chlorine are employed in vapor form.

9. Process according to claim 8 wherein said aldehyde and chlorine vapors are preheated prior to said reaction to a temperature of from 200 to 450° C.

10. Process according to claim 1, wherein said molar ratio is 1:1–1.3.

References Cited
UNITED STATES PATENTS

| | | | |
|---|---|---|---|
| 3,274,242 | 9/1966 | Etherington | 260—544 |
| 2,490,386 | 12/1949 | Tess | 260—544 |

LORRAINE A. WEINBERGER, Primary Examiner

E. J. GLEIMAN, Assistant Examiner

U.S. Cl. X.R.

260—526